United States Patent
Veltman

(10) Patent No.: US 10,503,894 B2
(45) Date of Patent: Dec. 10, 2019

(54) SECURE PROCESS IMPERSONATION

(71) Applicant: NCR Corporation, Duluth, GA (US)

(72) Inventor: Nir Veltman, Johns Creek, GA (US)

(73) Assignee: NCR Corporation, Atlanta, GA (US)

( * ) Notice: Subject to any disclaimer, the term of this patent is extended or adjusted under 35 U.S.C. 154(b) by 469 days.

(21) Appl. No.: 15/251,172

(22) Filed: Aug. 30, 2016

(65) Prior Publication Data

US 2018/0060565 A1    Mar. 1, 2018

(51) Int. Cl.
| | |
|---|---|
| *G06F 21/51* | (2013.01) |
| *G06F 21/44* | (2013.01) |
| *H04L 29/06* | (2006.01) |
| *H04W 12/06* | (2009.01) |
| *H04W 12/08* | (2009.01) |
| *G06F 21/57* | (2013.01) |

(52) U.S. Cl.
CPC .............. *G06F 21/51* (2013.01); *G06F 21/44* (2013.01); *G06F 21/57* (2013.01); *H04L 63/08* (2013.01); *H04L 63/10* (2013.01); *H04W 12/06* (2013.01); *H04W 12/08* (2013.01); *G06F 2221/033* (2013.01)

(58) Field of Classification Search
CPC .... G06F 21/51; G06F 21/44; G06F 2221/033; H04W 12/08; H04W 12/06; H04L 63/08; H04L 63/10
See application file for complete search history.

(56) References Cited

U.S. PATENT DOCUMENTS

| | | | | |
|---|---|---|---|---|
| 7,181,016 | B2* | 2/2007 | Cross | G06Q 20/3829 380/277 |
| 7,639,629 | B2* | 12/2009 | Kumar | G06F 21/41 370/252 |
| 7,721,281 | B1* | 5/2010 | Cherepov | G06F 21/55 717/171 |
| 7,921,461 | B1* | 4/2011 | Golchikov | G06F 21/575 713/2 |
| 8,667,569 | B2* | 3/2014 | Tesch | G06F 21/45 707/698 |
| 9,281,946 | B2 | 3/2016 | Crowder, Jr. | |
| 2004/0091114 | A1* | 5/2004 | Carter | G06F 21/606 380/259 |
| 2009/0259855 | A1 | 10/2009 | de Cesare et al. | |
| 2010/0293614 | A1* | 11/2010 | Vilppola | G06F 21/51 726/22 |
| 2013/0055369 | A1 | 2/2013 | Kumar et al. | |

(Continued)

FOREIGN PATENT DOCUMENTS

EP    0849657 A1    6/1998

OTHER PUBLICATIONS

Partial European Search Report dated Jan. 15, 2018 in co-pending European Patent Application EP17186830.

*Primary Examiner* — Robert B Leung
*Assistant Examiner* — Thomas Ho
(74) *Attorney, Agent, or Firm* — Schwegman, Lundberg & Woessner

(57) ABSTRACT

An Operating System (OS) command launcher or loader is newly obfuscated each time a command is successfully processed by the OS command launcher. Moreover, a binary for the OS command launcher is validated each time a command is attempted to be processed for execution by the OS command launcher.

6 Claims, 6 Drawing Sheets

(56) References Cited

U.S. PATENT DOCUMENTS

| | | | |
|---|---|---|---|
| 2013/0086388 A1* | 4/2013 | Tesch | H04L 9/3236 713/183 |
| 2015/0074425 A1* | 3/2015 | Griffes | H04L 9/0822 713/193 |
| 2017/0103015 A1* | 4/2017 | Bosschaert | G06F 11/3688 |
| 2018/0039771 A1* | 2/2018 | Konstantinov | G06F 21/121 |

* cited by examiner

US 10,503,894 B2

SECURE PROCESS IMPERSONATION

BACKGROUND

Automated Teller Machines (ATM) are publicly believed to be relatively secure devices since they handle consumer financial transactions. However, ATMs are susceptible to malware, viruses, and eavesdropping just like any other device having memory and processor capabilities.

In addition, other types of Self-Service Terminals (SSTs), which may be believed to be less secure than ATMs), such as: kiosks, Self-Service Checkouts (SSCOs), and publicly-accessible computing devices (e.g., restaurants, hotels, public library, etc.) also experience substantial security threats. In fact, eavesdropping or Man-In-The-Middle (MITM) attacks on SSCOs can result in compromising any consumer credit/debit card information. A single SSCO in a store can handle tens of thousands of customers in a given week and the store can have many SSCOs.

Most publicly-accessible terminals, allow users to operate a subset of operations restricting access to other more sensitive operations. Typically, the allowed operations execute with the security privileges of an initial user that logged into the Operating System (OS) of the terminal. However, even when the initial user has minimal OS privileges, some known security risks cannot be fully mitigated, such as changes made to: logs, configuration files, and dynamic information generated in memory when processing programs within the context of the OS.

Furthermore, even with the strictest permissions level set in the OS, an eavesdropping process is still able to read sensitive information from memory during runtime. Thus, a potential hacker is still able to steal sensitive data (e.g., private consumer information, such as credit/debit card information, names, addresses, etc.).

SUMMARY

In various embodiments, methods and a Self-Service Terminal (SST) for secure process impersonation are presented.

According to an embodiment, a method for process isolation is presented. Specifically, a command is identified for execution during a session with an Operating System (OS). An executable for an OS command launcher is retrieved from a location that is based at least in part on the session. Finally, the executable is validated before processing the executable to launch the command for execution within the OS.

DETAILED DESCRIPTION

Figure 1A:
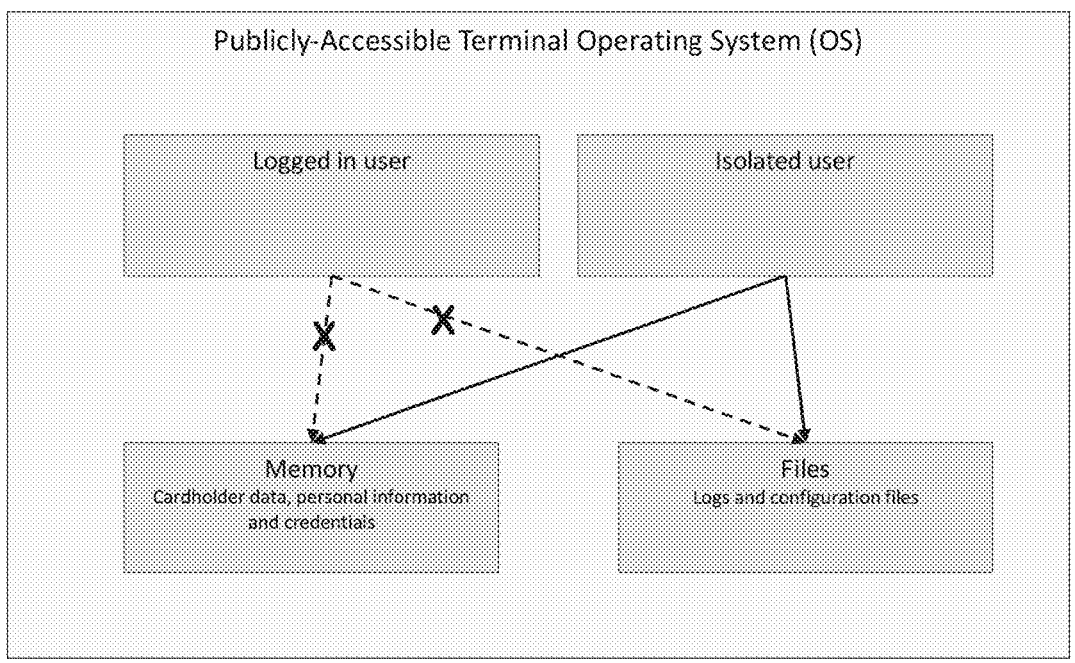
FIG. 1A is a diagram of a publicly-accessible terminal having secure process impersonation, according to an example embodiment.

FIG. 1A is a diagram of a publicly-accessible terminal having secure process impersonation, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of secure process impersonation, presented herein and below.

The publicly-accessible terminal's Operating System (OS) is illustrated in the FIG. 1A. After initial authentication a user is logged into the OS with permissions set based on authentication for the user. The OS provides access to a variety of physical and logical resources, such as peripheral devices, memory, files, non-volatile storage, network connections, and the like. Access to specific resources are governed by the permissions set on the user identity for the user.

However, conventionally the user-process space for user activity is not isolated nor is user-activity validated (beyond initial user logon). Consequently, conventional user-activity space within memory (programs executed, files accessed, etc.) during an OS session occupies at least some of the same execution space as secured resources or is permitted to run commands that exist in the secured-area of the OS (and outside the user execution space, such as the OS command/process loader or launcher). The conventional approach would only include the dashed lines that are x'd out in the FIG. 1A. This conventional approach is not what is done with the secure process impersonation discussed herein (illustrated by the isolated user and solid (unbroken lines) from the isolated user to memory and files of the OS in the FIG. 1A).

As discussed more completely herein and below, when a user has authenticated for access with the OS of a publicly-accessible terminal (hardware processor-enabled device, such as by way of example, an ATM, a SST, a SSCO, and a kiosk), the location of the OS command/program loader/launcher for process operation (user-directed activity) is obfuscated and validated each time an attempt is made by the user to launch/load any process (command or operation) within the OS session.

That is, any command or command activation (such as through a touch on a touch-enabled display, pressing an enter key, and/or a mouse click), which a user attempts during an authenticated session with the OS, the command loader or launcher is validated (to ensure it has not been altered). Moreover, each iteration of a user to access the command loader or launcher entails a new encryption of the loader or launcher, such that decryption for initial access to the loader or launcher within the OS is specific to each attempt the user makes to access a command during an authenticated session with the OS. Thus, even if a user were attempting to execute a same process two times in a row, the decryption of the OS loader or launcher changes and is revalidated. This ensures that each command executed is secure and ensures that the entire authenticated session for the user within the OS is isolated and walled off within the OS from other processes within memory and from other resource files.

This is a substantial improvement over existing mechanisms, such as the WINDOWS® "runas" command, which does support process isolation but which does not validate the runas command itself. The same is true for other OSs that support a similar command or operation for processing isolation; these other OSs do not actually change a key needed to run the command and revalidate the command during each attempt to run the command is made.

Moreover, with publicly-accessible terminals (such as ATMs, SSTs, SSCOs, and the like), when these terminals are initially setup for public access by other public users, a sign-in user account is logged into the OS having preset OS permissions and access to the OS resources, the OS session from the signed-in user account remains until the terminal session is terminated in some manner (e.g., power failure, intentional terminal boot, session sign out, terminal fault (unintentional terminal boot), etc.). During this OS session (using the sign-in user account), multiple different actual customers (public users) will operate the terminals. For example, consider a SST that is initially booted for customer operation, store personnel will authenticate to the SST OS and establish an OS session with a set of features and programs that execute on the SST. When customers (public users) subsequently operate the SST for a checkout transaction, the OS is processing within the store personnel set session using a specific single public user-account having specific OS permissions and access to specific OS programs and files. A variety of customers may access and operate the SST; in fact, store personnel may have reasons for also accessing the SST during the same OS session established for customer use. This exposes the public-accessible terminals to a variety of different users during that single authenticated OS session and presents substantial security risks though intentional and sometimes even unintentional user actions. The techniques presented herein ensures that each time a process or process command is executed during that OS session, the true and authenticate OS loader and launcher is only accessible to perform that process or command if the OS loader and launcher can be successfully decrypted and validated for that specific process or command during the OS session. This provides process isolation for each command executed during the OS session.

Figure 1B:
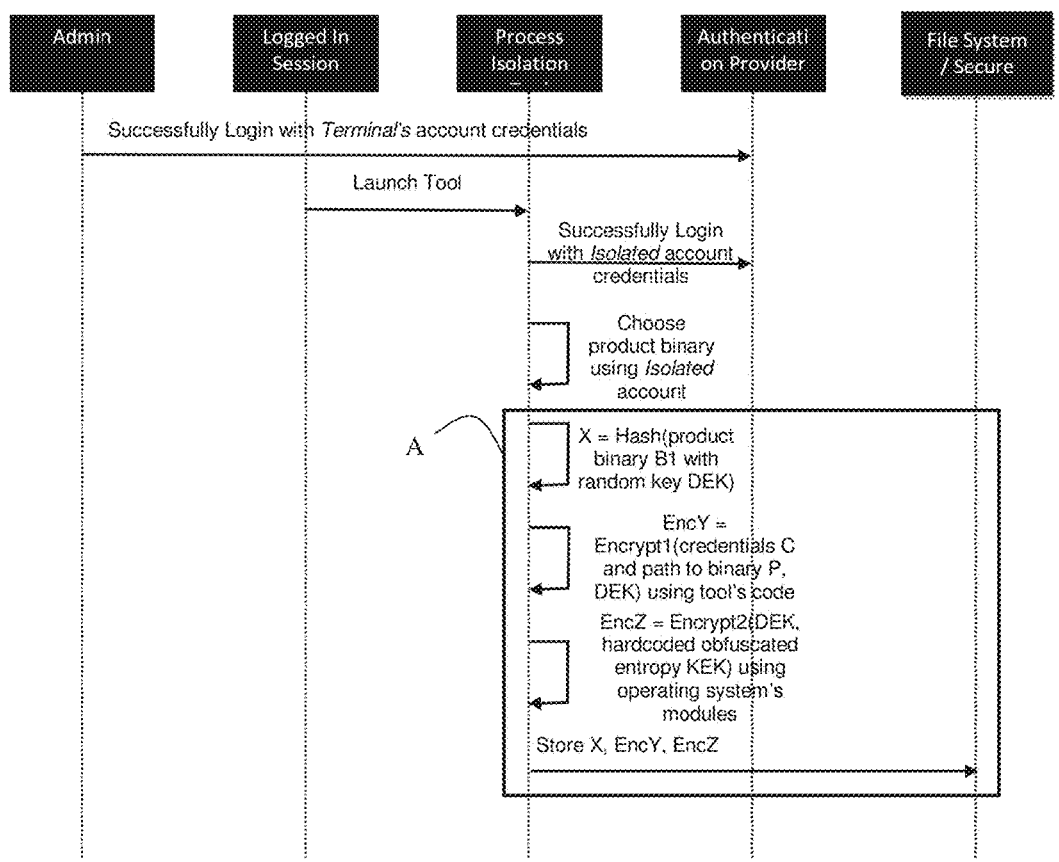
FIG. 1B is a diagram depicting initialization of a public-accessible terminal for secure process impersonation, according to an example embodiment.

The FIG. 1B illustrates a one-time installation and setup for performing the secure process impersonation discussed herein. It is noted that this initialization need only be performed during installation and does not have to be repeated (except for the block of processing identified as "A," in the FIG. 1B, which is discussed in the FIG. 1C.

On initialization, an administrator logs into a publicly-accessible terminal with account credentials (such as an identifier and password combination, a card swipe with a Personal Identification Number (PIN), and other types of credentials). This established an OS session for the user-account (admin) provided credentials within the OS execution space. A product binary (executable) for the OS loader/launcher is selected using the isolated account. That is, multiple different binaries or executables for the OS loader/launcher may exist and one is selected for the specific account credentials associated with the OS session.

Next, a hash value X is calculated on the OS loader/launcher binary/executable with a randomly generated Data Encryption Key (DEK). Then, the account credentials for the session, the file path to the OS loader/launcher binary/executable, and the DEK are encrypted producing encrypted first data (EncY). Second encrypted data (EncZ) is produced by encrypting: the DEK, a hardcoded obfuscated entropy Key Encryption Key (KEK) by using existing OS modules for such encryption. The hash value (X), the first encrypted data (EncY), and the second encrypted data (EncZ) are then stored.

After the above processing has completed, the OS command/process loader or launcher is secured a first time and ready for providing secure process impersonation on the publicly accessible terminal.

Figure 1C:
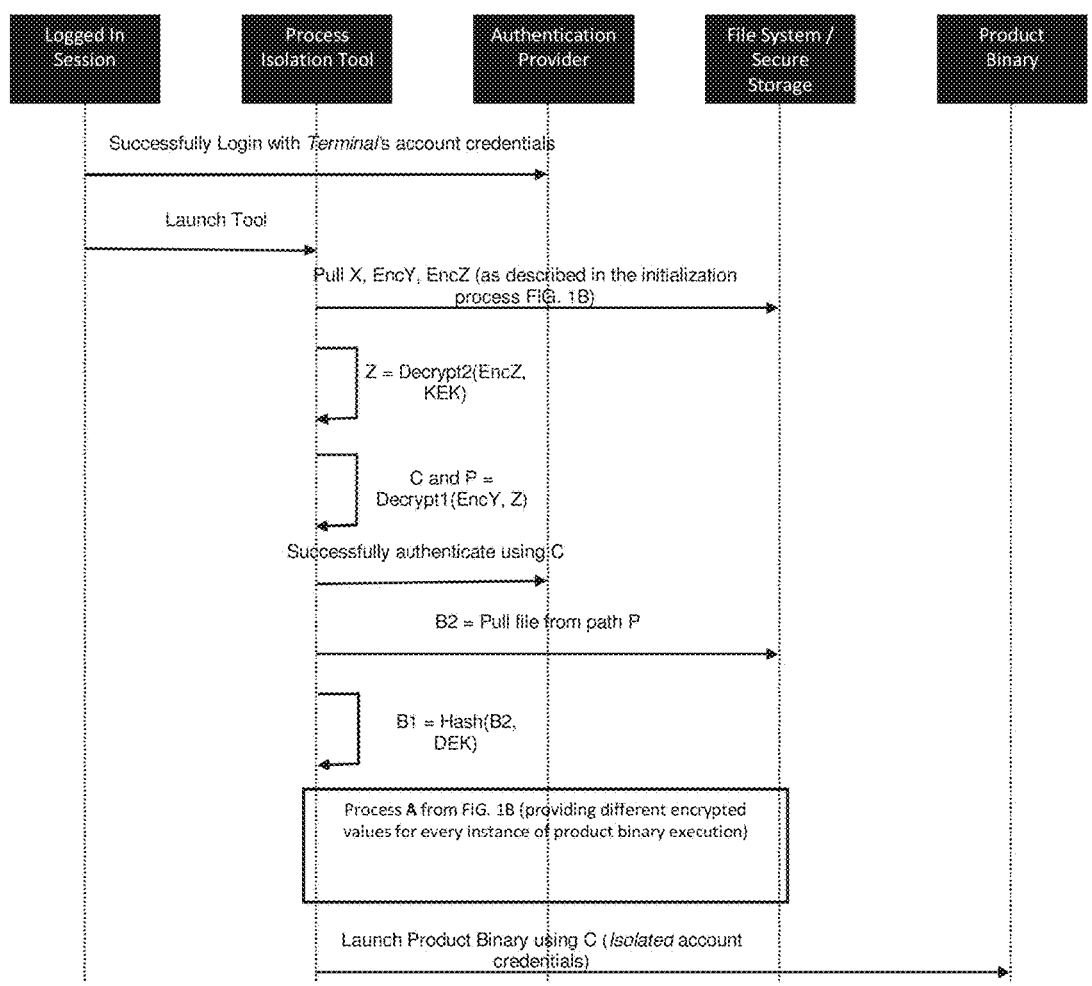
FIG. 1C is a diagram depicting execution of secure process impersonation on an initialized publicly-accessible terminal, according to an example embodiment.

The FIG. 1C illustrated processing of secure process impersonation after initial (and one time) initialization was performed as discussed in the FIG. 1B.

When a user authenticates for access to a session with an OS of the publicly-accessible terminal, the secure process impersonation proceeds as follows. The hash value X, the first encrypted data EncY, and the second encrypted data EncZ are pulled from storage. The DEK (as Z) is obtained by decrypting EncZ with the KEK. Next, the account credentials C and the resource/file path to the OS command/process loader or launcher are obtained by decrypting EncY with the decrypted version of the DEK (Z). The session is then authenticated by verifying (with the authentication provider for user accounts within the OS) that the decrypted version of the account credentials can be successfully authenticated.

The binary/executable for the decrypted path (P) to the OS command/process loader or launcher is pulled from the file system or secure storage accessible to the OS as B2. Next, a has value B1 is obtained by hashing the binary retrieved B2 with the DEK (Z).

B1 is then compared with X (hash value computed originally on the binary/executable of the OS command/process loader or launcher. the binary B2 is validated by hashing B2 with the DEK (Z)). If a match is made between B1 and X, then the binary/executable for the OS command/process loader or launcher is what it should be and has not be altered or changed.

Next, a new hash value for the binary/executable of the OS command/process loader or launcher is obtained (for a next time that the OS command/process loader or launcher is attempted to be executed within the OS for this authenticated session associated with the account credentials. This is done by iterating back to the block of processing identified as A in the FIG. 1B where a new randomly generated DEK is produced and hashed on the binary producing a new value for X. The DEK is then used to produce a new encrypted first data EncY by encrypting the account credentials and the path to the binary with the DEC. Then, the DEC is encrypted with the KEK to produce a new encrypted second data. The new value for X, EncY, and EncZ are then stored for when a new command/process is attempted to loaded or launched by the OS with the OS command/process loader or launcher.

This process occurs each time a user attempts to run or execute a command within the OS ensuring that the OS command/process loader or launcher is validated and authenticated. The hashing values and the encrypted data is unique for each command a user attempts to execute in the OS. Moreover, each command involves double layer encryption some of which can be leverage through existing operating system-provided encryption (EncZ) and some of which is entirely random (EncY). This makes breaking the encryption extremely difficult for a hacker. Moreover, the account credentials are encrypted byte by byte and the actual data for the values are never stored or retained in memory. The keys are replaced each time the OS command/process loader or launcher is executed (each iteration). The file path of the OS command/process loader or launcher is validated during each attempt that the OS command/process loader or launcher is attempting to execute a user process or command within the OS, which means the ability to substitute a malicious executable or file in place of the OS command/process loader or launcher is greatly diminished if not eliminated. Moreover, because the user selected command/process for execution is launched after authentication and validation of the OS command/process loader or launcher, there is no adverse impacts on performance throughput of the user selected command/process on the publicly-accessible terminal.

These and other embodiments are now discussed with reference to the FIGS. 2-4.

Figure 2:
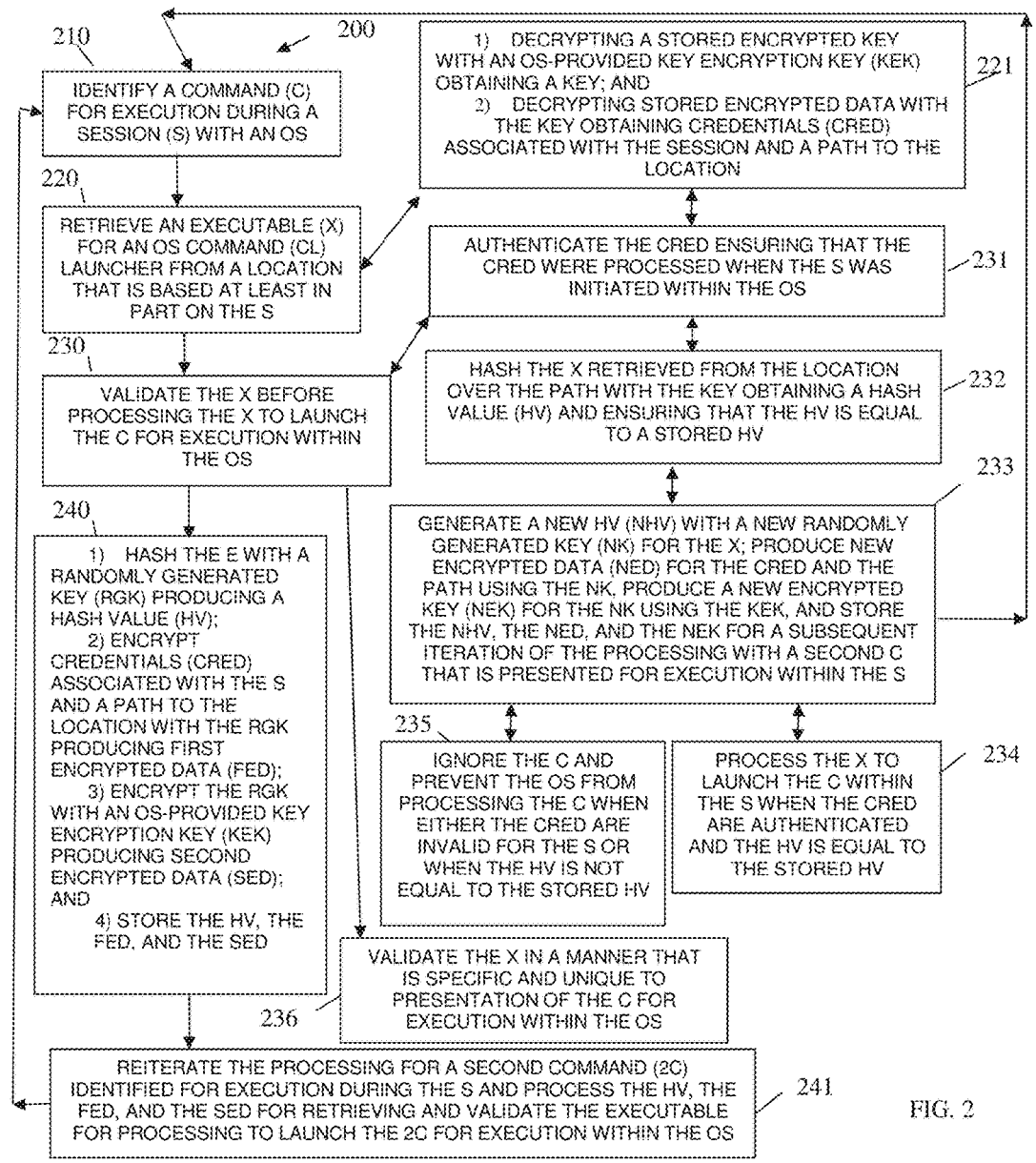
FIG. 2 is a diagram of a method for secure process impersonation, according to an example embodiment.

FIG. 2 is a diagram of a method 200 for secure process impersonation, according to an example embodiment. The software module(s) that implements the method 200 is referred to as an "OS-session command handler." The OS-session command handler is implemented as executable instructions programmed and residing within memory and/or a non-transitory computer-readable (processor-readable) storage medium and executed by one or more processors of a device. The processor(s) of the device that executes the OS-session command handler are specifically configured and programmed to process the OS-session command handler. The OS-session command handler may or may not have access to one or more network connections during its processing. The network connections can be wired, wireless, or a combination of wired and wireless.

In an embodiment, the device that executes the OS-session command handler is a Point-Of-Sale (POS) terminal.

In an embodiment, the device that executes the OS-session command handler a SST. In an embodiment, the SST is one of: an ATM, a kiosk, and a SSCO station.

In an embodiment, the OS-session command handler performs the processing discussed above with the FIGS. 1A-1C.

The OS-session command handler operates within as a kernel processing within an OS of the device that executes the OS-session command handler.

The processing of the OS-session command handler assumes that initializing was performed at least once when the OS-session command handler is initially installed on the device that executes the OS-session command handler (processing described in the FIG. 1B above). This sets up a first iteration and subsequent iterations of the OS-session command handler as described herein and below.

At 210, the OS-session command handler identifies a command for execution during a valid authenticated session with the OS. That is, a command or process is selected or identified for execution during the OS session. Typically, the existing OS command launcher or loader would be executed to process the identified command within a processing context of the OS session having the permissions set on the OS session based on the account that was used to authenticate and log into the OS account for the session. This processing is changed here, such that the OS command launcher is uniquely validated each time any command is presented for the OS command launcher to load or launch for execution within the OS session.

At 220, the OS-session command handler retrieves an executable (binary) for the OS command launcher from a location that is based at least in part on the session.

In an embodiment, at 221, the OS-session command handler decrypts a stored encrypted key with an OS-provided and generated KEK for obtaining a key. The OS-session command handler also decrypts stored encrypted data with the key for obtaining credentials associated with the session and a path to the location of the executable for the OS command launcher. The credentials were used to initially establish the OS session and are tied to an authorized OS account.

At 230, the OS-session command handler validates the executable for the OS command launcher before processing the executable, which launches the command for execution within the OS during the OS session.

In an embodiment of 221 and 230, at 231, the OS-session command handler authenticates the credentials so as to ensure that the credentials were processed when the session was initiated within the OS. That is, the session was established with a predefined OS account using the credentials and each time any command is requested for processing within the session, the OS-session command handler re-authenticates the credentials to ensure that the requested command is in fact associated with and verified with the session where the command is being requested for execution.

In an embodiment of 231 and at 232, the OS-session command handler hashes the executable for the OS command launcher retrieved from the location over a path with the key for obtaining a hash value. The OS-session command handler, then, ensures that the hash value is equal to a stored hash value (stored for a previous iteration of the OS-session command handler either during initialization (as discussed in the FIG. 1B) or stored following a successful processing by the OS command launcher of a previous command).

In an embodiment of 232 and at 233, the OS-session command handler generates a new hash value with a new randomly generated key for the executable of the OS command launcher. The OS-session command handler also produces new encrypted data for the credentials and the path to the location of the OS command launcher using the new randomly generated key and, thereby, producing a new encrypted key for the newly randomly generated key using the KEK. Additionally, the OS-session command handler stores the new hash value, the new encrypted data, and new encrypted key for a next or subsequent iteration of the OS-session command handler with a second command that is presented for execution within the OS session. It is noted that the second command can be the same as the original identified command, at 210, where it is being presented for execution a second time during the OS session. It is also noted that the second command can be a different command from the command identified at 210. So, the second command is any command that is being requested for execution by the OS command handler following the initial identified command, at 210.

In an embodiment of 233 and at 234, the OS-session command handler processes the executable for the OS command launcher within the OS session when the credentials are authenticated and when the hash value is equal to the stored hash value. So, before the OS command launcher is permitted to handle and load the command (at 210) for execution within the OS session, the OS-session command handler has to re-authenticate the credentials and validate the integrity of the executable for the OS command launcher ensuring that it has not been modified in any manner since the OS command launcher was last successfully processed within the OS session.

In an embodiment of 233 and at 235, the OS-session command handler ignores the command and prevents the OS from processing the command when either the credentials are determined to be invalid for the session or when the hash value is not equal to the stored hash value. That is, the OS-session command handler never permits the OS command launcher to load and launch the command, at 210, within the OS when either the session scope is invalid (credentials cannot be re-authenticated) or when the integrity of the binary for the OS command launcher is invalid (has a hash value different from what is expected for the binary).

According to an embodiment, at 240, the OS-session command handler hashes the executable with a randomly generated key producing a hash value. Next, the OS-session command handler encrypts the credentials associated with the session and a path to the location of the OS command launcher with the randomly generated key producing first encrypted data. Then, the OS-session command handler encrypts the randomly generated key within an OS-provided and generated KEK producing second encrypted data. Finally, the OS-session command handler stores the hash value, the first encrypted data, and the second encrypted data for a next iteration of the OS-session command handler where a second command is presented during the OS session for loading and launching by the OS command launcher.

Figure 3:
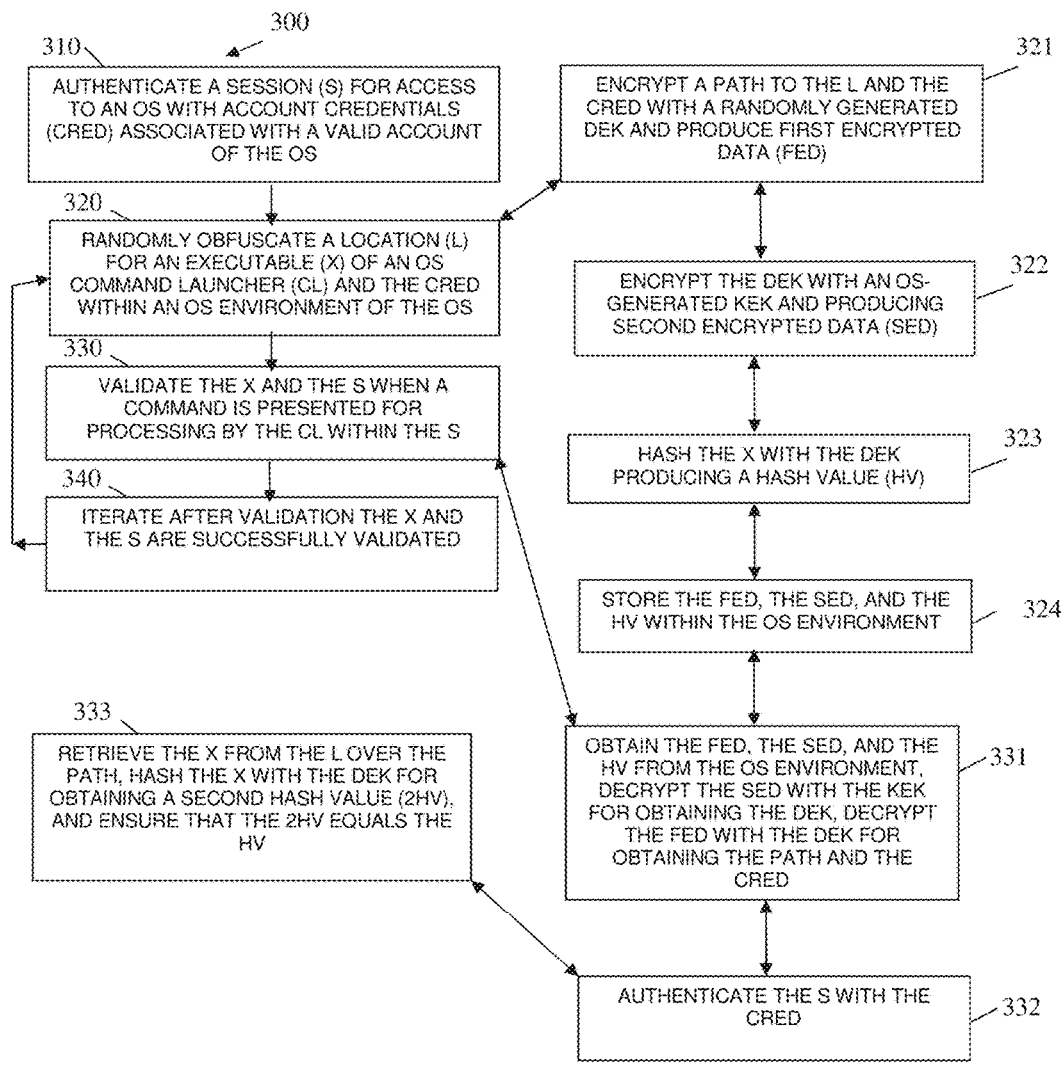
FIG. 3 is a diagram of another method for secure process impersonation, according to an example embodiment.

FIG. 3 is a diagram of another method 300 for secure process impersonation, according to an example embodiment. The software module(s) that implements the method 300 is referred to as an "OS-session command validator." The OS-session command validator is implemented as executable instructions programmed and residing within memory and/or a non-transitory computer-readable (processor-readable) storage medium and executed by one or more processors of a device. The processors that execute the OS-session command validator are specifically configured and programmed to process the OS-session command validator. The OS-session command validator may or may not have access to one or more network connections during its processing. The network connections can be wired, wireless, or a combination of wired and wireless.

In an embodiment, the device that executes the OS-session command validator is a POS terminal.

In an embodiment, the device that executes the OS-session command validator is a SST. In an embodiment, the SST is one of: an ATM, a kiosk, and a SSCO station.

In an embodiment, the OS-session command validator is the processing discussed above with the FIGS. 1B-1C.

In an embodiment, the OS-session command validator is the processing discussed above with the method 200.

In an embodiment, the OS-session command validator is all or some combination of the processing discussed in the FIGS. 1B-1C and 2.

Again, the OS-session command validator assumes that a one-time initial process as described in the FIG. 1B was performed to initially set the OS-session command validator up for iterating and validating OS-issued commands during an OS session.

At 310, the OS-session command validator authenticates a session for access to an OS with account credentials associated with a valid and authorized account on the OS.

At 320, the OS-session command validator randomly obfuscates a location from an executable (binary) of an OS command launcher and the credentials within an OS environment of the OS. This is done with a mechanism that is unique to each iteration (iteration specific) of the OS-session command validator during the valid OS session. So, when a command is successfully launched for execution during the OS session by the OS command launcher during a first iteration the mechanism for randomly obfuscating the location of the OS command launcher and the credentials for the session is different from that which occurs during a second iteration.

According to an embodiment, at 321, the OS-session command validator encrypts a path to the location and the credentials with a randomly generated DEK and produces first encrypted data.

In an embodiment of 321 and at 322, the OS-session command validator encrypts the DEK with an OS-generated KEK and produces second encrypted data.

In an embodiment of 322 and at 323, the OS-session command validator hashes the executable for the OS command launcher with the DEK and produces a hash value.

In an embodiment of 323 and at 324, the OS-session command validator stores the first encrypted data, the second encrypted data and the hash value within the OS environment or at a storage location that is accessible to the OS from the OS environment.

At 330, the OS-session command validator validates the integrity of the executable for the OS command launcher and the session when a command is presented for processing by the OS command launcher within the session.

According to an embodiment of 324 and 330, at 331, the OS-session command validator obtains the first encrypted data, the second encrypted data, and the hash value from the OS environment. Next, the OS-session command validator decrypts the second encrypted data with the KEK for obtaining the DEK; then, the OS-session command validator decrypts the first encrypted data with the DEK for obtaining the path and the OS session credentials.

In an embodiment of 331 and at 332, the OS-session command validator authenticates the session with the credentials. That is, the authentication provider of the OS is provided the credentials for re-authentication during the session.

In an embodiment of 332 and at 333, the OS-session command validator retrieves the executable for the OS command launcher from the location over the path; then, the OS-session command validator hashes the retrieved executable with the DEK for obtaining a second hash value. Finally, the OS-session command validator ensures that the second hash value is equal to the hash value.

At 340, the OS-session command validator iterates during the session back to 320 once the initially processed command is successfully loaded and launched by a validated instance of the OS command launcher.

Figure 4:
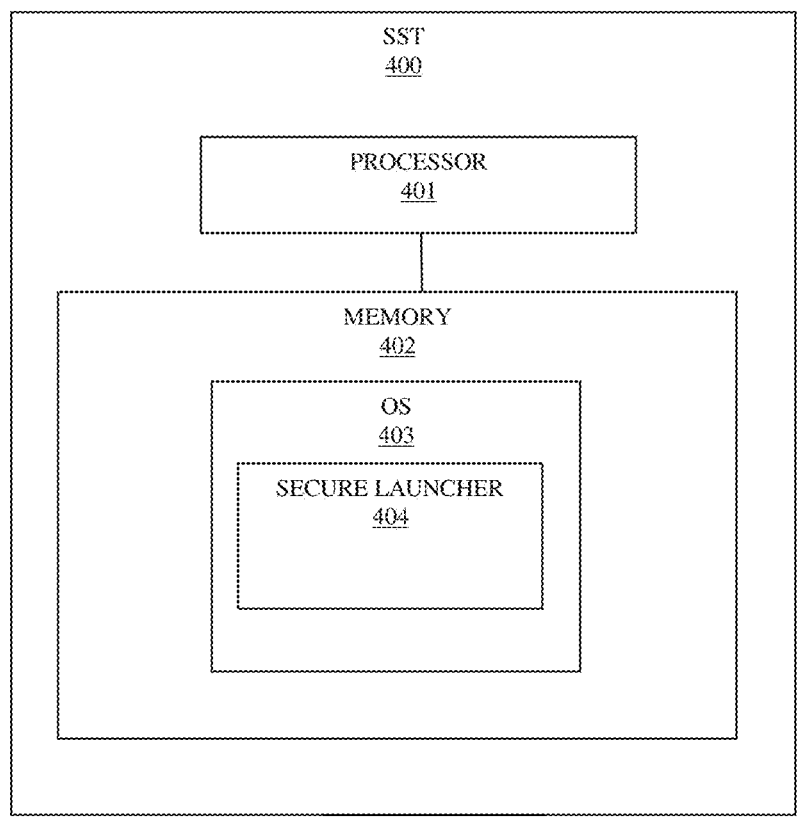
FIG. 4 is a diagram of a Self-Service Terminal (SST) having secure process impersonation, according to an example embodiment.

FIG. 4 is a diagram of a SST 400 having secure process impersonation, according to an example embodiment. The SST 400 includes a variety of hard ware components and software components. The software components of the SST 400 are programmed and reside within memory and/or a non-transitory computer-readable medium and execute on one or more processors of the SST 400. The SST 400 may or may not communicate over one or more networks, which can be wired, wireless, or a combination of wired and wireless.

In an embodiment, the SST 400 is a POS terminal.
In an embodiment, the SST 400 is an ATM.
In an embodiment, the SST 400 is a kiosk.
In an embodiment, the SST 400 is a SSCO station.
In an embodiment, the SST 400 implements, inter alia, the processing described above with the FIGS. 1B-1B and 2-3.

The SST 400 includes a processor 401, memory 402, an OS 403, and a secure launcher 404.

The processor 401 is configured to execute the OS 403 from memory 402 of the SST 400.

The OS 403 is configured to execute the secure launcher 404 each time a command is presented within an OS session for an OS command launcher to load and process within the session-context on the SST 400.

The secure launcher 404 is configured to: execute on the processor 401 from the memory 402, determine a location for an executable to an OS command launcher each time any command is presented for processing within a session of an OS of the SST 400, validate account credentials for the session each time any command is presented for processing within the session, and validate the executable pulled from the location each time any command is presented for processing within the session.

The secure launcher 404 is further configured to: uniquely hide an identifier for the location and a mechanism for validating the executable each time any command is successfully processed by the OS command launcher. In an embodiment, the mechanism is any of the processing discussed above with the FIGS. 1B-1C and 2-3.

In an embodiment, the secure launcher 404 is any, all, or some combination of the processing discussed above with the FIGS. 1B-1C and 2-3.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
identifying a command for execution during a session with an Operating System (OS); and
retrieving an executable for an OS command launcher from a location that is based at least in part on the session;
validating the executable before processing the executable to launch the command for execution within the OS;
hashing the executable with a randomly generated key producing a hash value;
encrypting credentials associated with the session and a path to the location with the randomly generated key producing first encrypted data;
encrypting the randomly generated key with an OS-provided Key Encryption Key (KEK) producing second encrypted data; and
storing the hash value, the first encrypted data, and the second encrypted data.

2. The method of claim 1 further comprising, reiterating the method processing for a second command identified for execution during the session and processing the hash value, the first encrypted data, and the second encrypted data for retrieving and validating the executable for processing to launch the second command for execution within the OS.

3. A method, comprising:
identifying a command for execution during a session with an Operating System (OS); and
retrieving an executable for an OS command launcher from a location that is based at least in part on the session; and
validating the executable before processing the executable to launch the command for execution within the OS;
decrypting a stored encrypted key with an OS-provided Key Encryption Key (KEK) obtaining a key;
decrypting stored encrypted data with the key obtaining credentials associated with the session and a path to the location;
wherein validating further includes authenticating the credentials ensuring that the credentials were processed when the session was initiated within the OS;
wherein authenticating further includes hashing the executable retrieved from the location over the path with the key obtaining a hash value and ensuring that the hash value is equal to a stored hash value; and
generating a new hash value with a new randomly generated key for the executable, producing new encrypted data for the credentials and the path using the new randomly generated key, producing a new encrypted key for the newly generated key using the KEK, and storing the new hash value, the new encrypted data, and the new encrypted key for a subsequent iteration of the method with a second command that is presented for executing within the session.

4. The method of claim 3 further comprising, processing the executable to launch the command within the session when the credentials are authenticated and the hash value is equal to the stored hash value.

5. The method of claim 3 further comprising, ignoring the command and preventing the OS from processing the command when either the credentials are invalid for the session or when the hash value is not equal to the stored hash value.

6. The method of claim 3, wherein validating further includes validating the executable in a manner that is specific and unique to presentation of the command for execution within the OS.

* * * * *